March 27, 1928.  1,663,579
A. ANDERBERG ET AL
BRAKE SYSTEM ACTUATED BY FLUID PRESSURE
Filed Aug. 18. 1926    4 Sheets-Sheet 1

Inventors:
Anders Anderberg
Erik Anders Anderberg

March 27, 1928.

A. ANDERBERG ET AL 1,663,579

BRAKE SYSTEM ACTUATED BY FLUID PRESSURE

Filed Aug. 18, 1926

Inventors:
Anders Anderberg
Erik Anders Anderberg
By
Attorney.

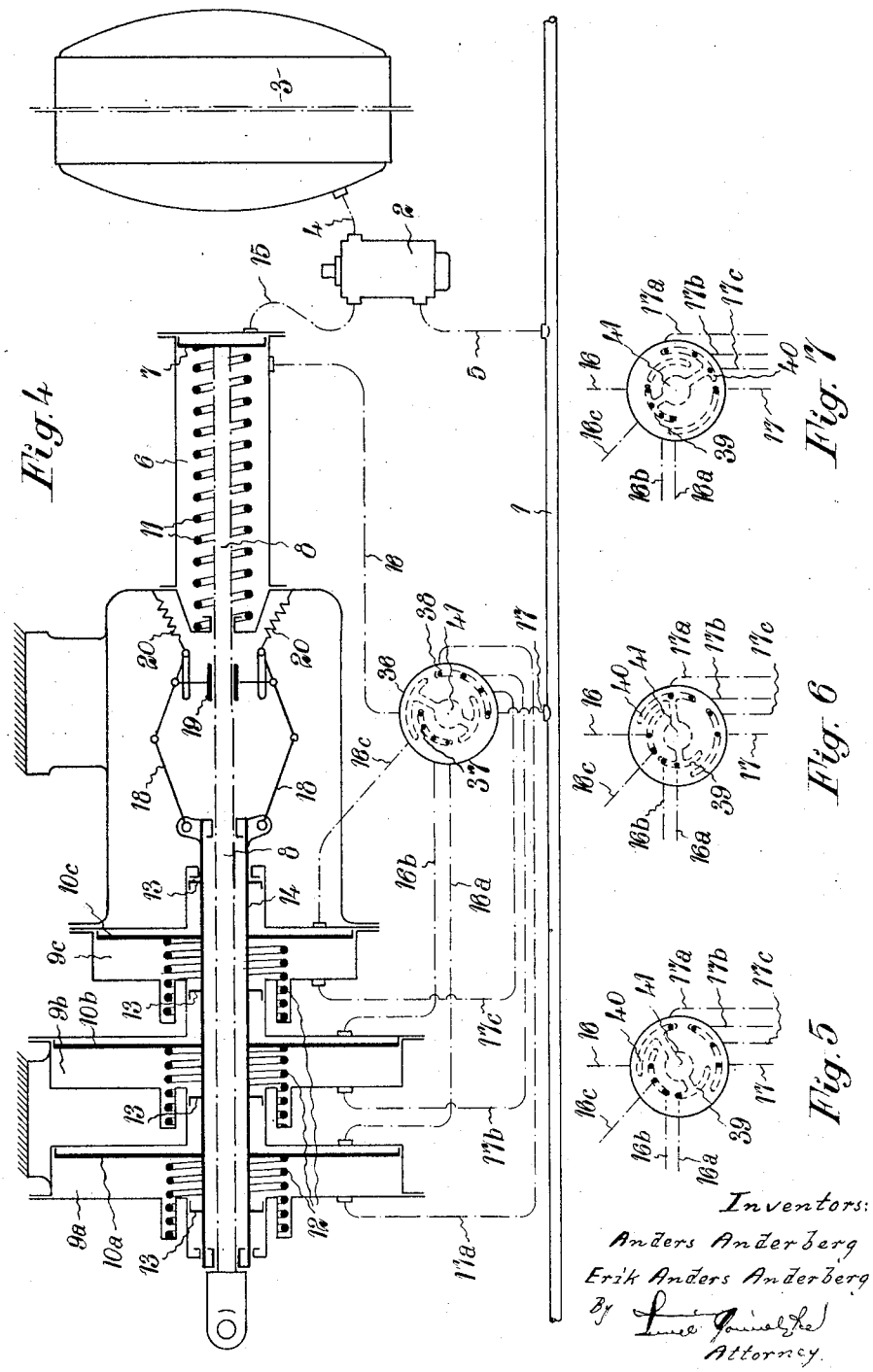

March 27, 1928.  1,663,579
A. ANDERBERG ET AL
BRAKE SYSTEM ACTUATED BY FLUID PRESSURE
Filed Aug. 18. 1926    4 Sheets-Sheet 4

Inventors:
Anders Anderberg
and Eric Anders Anderberg
By Emil Bonnelycke
Attorney Patented Mar. 27, 1928.

1,663,579

UNITED STATES PATENT OFFICE.

ANDERS ANDERBERG AND ERIK ANDERS ANDERBERG, OF MALMO, SWEDEN.

BRAKE SYSTEM ACTUATED BY FLUID PRESSURE.

Application filed August 18, 1926, Serial No. 130,036, and in Sweden August 19, 1925.

This invention relates to a brake system actuated by fluid pressure.

As is well known, two main types of air brakes exist, namely: the single-chamber brake in which the pressure acts on one side only of the piston, and the two-chamber brake in which pressure is applied on both sides of the piston and in which movement is obtained by the difference in the applied pressure.

Each of these two types of brakes has well known advantages and disadvantages, and in order to utilize the advantages of both types it has already been proposed to combine the two brakes into one single brake system, but in such a construction however disadvantages still remain. In addition such combination has rendered the mechanical contrivances very complicated especially as regards the brake rigging which transfers the movement of the pistons to the brake shoes and also with respect to the operating devices necessary for the operation of the combined brake. Thus, in this combination of both brake types each of the pistons moves a full stroke for a complete braking operation, so that large air consumption cannot be avoided, which is the most prominent disadvantage of the two-chamber brake, and further the pistons act upon different piston rods, lost motion of the pistons being arranged in order to obtain cooperation thereof.

The subject of the present invention comprises a compressed air or other fluid actuated brake combining the advantages of the conventional single chamber brake and of the two-chamber brake but without the disadvantages pertaining to these two types of brake. The invention comprises a combination of two brake types, one of which may be a single-chamber air brake or an electric brake, while the other is an improved two-chamber air brake, in which the improvement consists in that the pressures on both sides of the piston are only applied upon the actual application of the brake, while under all other conditions pressure is applied to one side only of the piston. For the sake of simplicity it is assumed in the following description that the first named part of the combination is constituted by a single-chamber air brake.

In the construction according to the invention both brakes act upon one and the same piston rod or the like, and by this means a considerably simplified arrangement for mechanically transferring the movement from the piston rod to the brake shoes is obtained. Further the brakes act successively one after the other, so that the single-chamber air brake or its equivalent substantially carries out the work of bringing the brake shoes in contact with the wheels, whereupon the improved two-chamber air brake comes into action and causes the actual braking pressure to be imposed upon the brake shoes.

In this way, a new principle for air brakes is utilized, in that the air saving single-chamber brake is utilized for effecting the relatively great movement necessary for bringing the brake shoes into contact with the wheels, while the two-chamber brake, being uneconomical from the air consumption point of view, is used only to apply the actual brake pressure.

For this reason the single-chamber air brake may be constructed with a smaller cylinder diameter than hitherto, because this brake does not have to overcome any substantial resistance. The air consumption therefore will also be less than heretofore and if for instance, as above stated, an electric solenoid brake is substituted for this single-chamber air brake, air consumption will obviously be totally avoided. As according to the present invention the two-chamber brake is not utilized to accomplish a movement but instead is only utilized to apply the actual braking pressure, the piston will have a minimum stroke and therefore the air consumption (volume of length of stroke) will be, in spite of the cylinder having a larger diameter than before, a fraction only of the air consumption necessary for operating the conventional two-chamber brakes.

As it is the single-chamber brake which effects the actual movement of the brake shoes, its special advantage, namely the quick action, is utilized; and as it is the two-chamber brake which effects the actual braking, the special advantage of this type is also made use of, namely that the applying and releasing of the brake may be performed successively and that its braking effect is not exhausted by repeated applications and releasings of the brake. In this way the disadvantages hitherto inherent in the two types of brake are totally avoided.

Furthermore, as both brakes act upon one and the same rod, any lost motion is unnecessary, so that not only is the necessary transmission system considerably simplified but also the operating means are very much simpler because of the cooperation of the brakes, which is the characteristic feature of the invention and which is achieved by the elimination of the complicated valve for controlling the cooperation of the pistons of both brakes. The so-called triple valve may also be considerably simplified.

The fact that the single-chamber brake or its equivalent is mainly utilized for bringing the brake shoes in contact with the wheels and for that reason has to make a stroke which under all conditions is dependent upon the distance between the brake shoes and the wheels, before the two-chamber air brake comes into action, results in that the brake system according to the present invention to a certain degree eliminates the use of automatic slack adjusters which serve the purpose of keeping the slack constant. No such constant slack is required for the reliable function of the present system, although obviously a further saving in air consumption may be obtained by keeping the slack at a certain minimum value. This becomes however a very unimportant factor, as the air consumption of the single-chamber air brake according to the invention in fact is already very little and does not come into consideration at all if instead of this air brake its equivalent, not actuated by compressed air, is used.

The invention is diagrammatically illustrated in the accompanying drawing in which:—

Figure 3 shows a modification of a detail in Figure 1.

Figure 4 shows diagrammatically a modification of the air brake system according to Figure 1.

Figures 5 to 7 show the rotary valve of Figure 4 in different positions.

Figure 1:
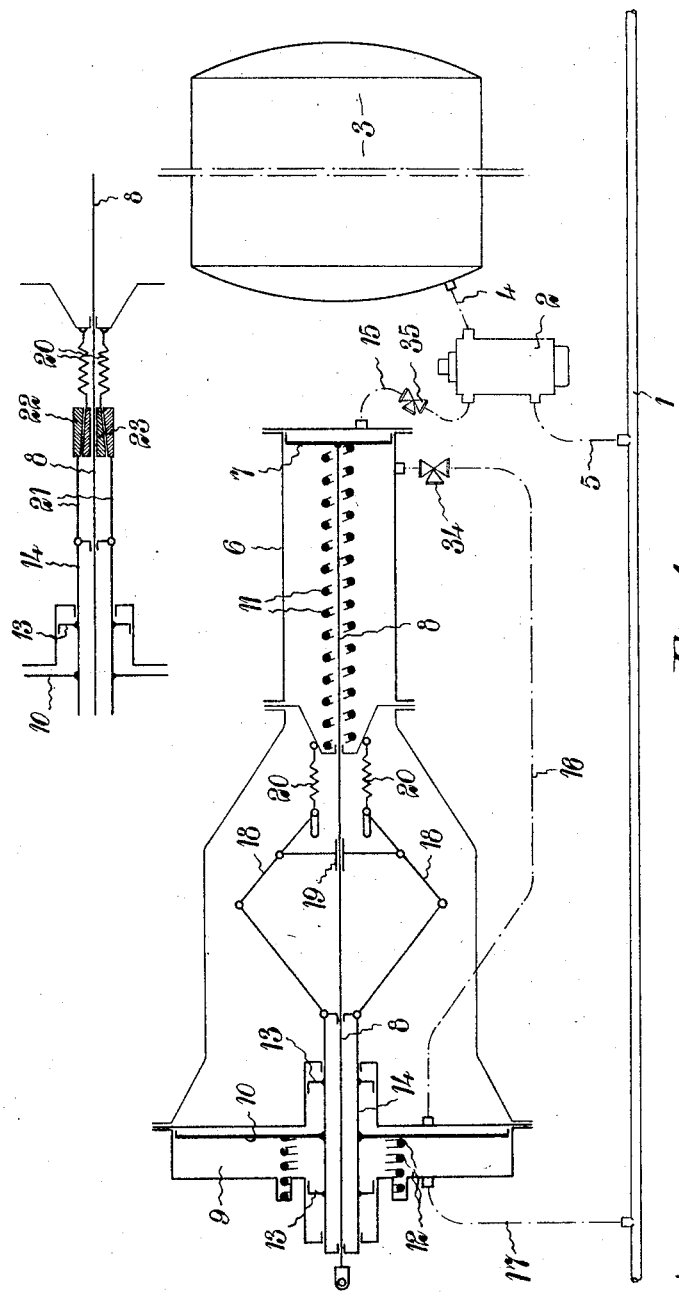
Figure 1 shows a general plan of the brake system according to the invention.

Figure 1 discloses a combination of two brakes according to the invention, in which one brake is assumed to be a single-chamber air brake and the other brake is a two-chamber air brake. The working operation of the latter is modified in comparison with older constructions by allowing the space on one side of the piston to be in communication with the atmosphere, when the brake is released. This will be more fully explained later.

Referring to the drawings 1 denotes the brake pipe which is connected by means of the pipe 5, the triple valve 2 and the pipe 4 with the auxiliary air reservoir 3. The cylinder of the single-chamber air brake is indicated at 6 and the movable piston therein at 7. The piston rod 8 common to both brakes is securely connected to the piston 7 and extends from the cylinder 6 into the cylinder 9 of the two-chamber air brake, through the piston 10 of which the rod 8 is freely slidable but will be connected thereto in one direction of movement of the piston, in a manner hereinafter described. Upon the piston 7 acts a return spring 11 and upon the piston 10 acts a similar spring 12. This last named spring is scarcely necessary for the function of the system but is utilized in order to obtain a certain predetermined position of the piston at brake release. The piston rod 8 needs no packing in the cover of the cylinder 6 and therefore passes freely through a central hole in the cover. The cylinder 9 of the two-chamber brake must however be provided with packings in both covers. For this purpose packing pistons 13 and the brake piston 10 are securely fixed to a central tube 14, through which the piston rod 8 freely passes, the tube 14 serving as guide for the latter.

The cylinder 6 of the single-chamber air brake is in communication at one end through a pipe 15 with the triple valve 2 and at a short distance from the cover is also in communication through a pipe 16 with the pressure space at one end of the cylinder 9 of the two-chamber air brake, while the other pressure space of the said cylinder 9 is in communication through a pipe 17 with the brake pipe 1, the drawing (Figure 1) showing the position of the parts when the brake is in "released" position.

In order to establish mechanical connection between the piston 10 of the two-chamber brake and the common piston rod 8, when the said piston moves in one direction, that is, upon the application of the brake (in a direction to the left in Figure 1) any kind of carrier or clutch device may be utilized. Figure 1 illustrates a preferred form of such a device which consists of a lever rigging 18 provided with clutches or friction shoes 19 engaging the piston rod 8, a pair of controlling springs 20 serving to increase the pressure of the friction shoes 19 upon the piston rod 8 to such an extent, that a firm connection between the piston 10 and the piston rod 8 is obtained without however preventing a longitudinal displacement of the entire carrier or clutch device.

Figure 3 illustrates another form of embodiment of the clutch device, like reference numerals denominating similar parts. In this case the tube 14 is connected by means of pivoted rods 21 to a conical sleeve 22 surrounding wedge like (conical) clutches 23 which surround the piston rod 8. The clutches are, as before, influenced by controlling springs 20. Any other type of clutch device may however be adopted and the invention is not limited to the types above described, the matter of importance being that a clutch device exists between the piston 10 and the piston rod 8, which device acts in one direction only, that is when the brakes are applied, and which does not prevent the return movement of the piston rod when the clutch action ceases, and further that this clutch device only begins to act when the piston 10 begins to move in the said one direction, and is immediately released when the piston moves in the opposite direction.

The piston rod 8 should be shaped in conformity with the surfaces on the clutch shoes 19 or 23. Thus, it may be provided with teeth, grooves, threads or the like, so that the clutch shoes, which have corresponding surfaces, may securely grip the piston rod without the possibility of sliding.

Figure 2:
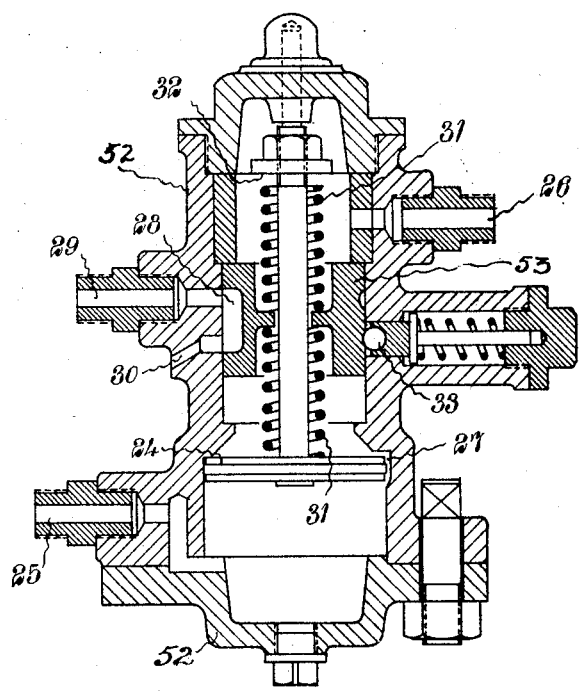
Figure 2 is a section through the triple valve.

The triple valve 2 (Figure 1) may be of very simple construction, and a preferred form is shown in Figure 2, in which 52 is the valve casing having a movable slide valve 53 therein, the longitudinal displacement of the slide valve 53 being effected by a piston 24. The valve casing is divided by the piston 24 into two chambers, one of which (under the piston) is in communication through the pipe connection 25 and the pipe 5 (Figure 1) with the brake pipe 1, while the chamber on the opposite (above) side of the piston 24, which also contains the slide valve 53, is in communication through the pipe connection 26 and the pipe 4 (Figure 1) with the auxiliary air reservoir 3. Both chambers will be in communication with each other, when the valve corresponds to the "release" position of the brake, by means of a so called feed groove 27 which in known manner forms a by-pass for the air in both chambers. The slide valve 53 is provided with a channel 28 adapted to effect communication of the pressure space of the cylinder 6 with the atmosphere by means of the pipe 15, pipe connection 29 and the passage 30, when the valve is positioned to correspond to the "release" position of the brake, while in the "application" position of the brake the slide valve closes the said communication with the atmosphere but brings the pipe connection 29 in communication with the pipe connection 26; that is to say, the auxiliary air reservoir 3 (Figure 1) is brought in communication with the pressure space of the cylinder 6 of the single-chamber brake. The slide valve is axially displaced by the piston 24 through the intermediary of helical springs 31, and as shown in Figure 2 the upper spring 31 does not reach up to its abutment on the piston rod but leaves a space 32 between the end of the spring and the said abutment. This space 32 corresponds to an axial displacement of the piston (without exerting a compressing effect on the spring) of such length only as will be sufficient to close the by-pass 27. In order to yieldingly retain the slide valve in definite positions, it is engaged by a ball 33 or the like actuated by a spring and adapted to be pressed into corresponding recesses in the slide valve, it being understood, that the recess corresponding to the "application" position of the brake is deeper than that corresponding to the "release" position, so that the locking of the valve in the first named position will be more powerful. By this means the difference in pressures for bringing the brake shoes into contact with the wheels need not be the same as for releasing the brake, and in this manner full certainty is obtained for the release of the two-chamber air brake before the single-chamber air brake commences its movement for releasing the brake shoes from the wheels.

The triple valve just described effects a sudden increase of pressure in the cylinder of the single-chamber air brake and therefore a quick movement of the brake shoes towards the wheels, which in the present case is the correct principle. Furthermore, on account of the locking device, the valve is practically unaffected by air waves generally originating in the system, when the conductor applies the brake. For this reason, the conductor's valve may also be simplified, the constructions of such valves hitherto in use having been very complicated, chiefly for reason of avoiding the said air waves.

In working operation, upon the application of the brake the conductor's valve connected to the brake pipe 1 is opened, as is well known, and as soon as the difference between the pressure in the auxiliary reservoir 3 and that in the brake pipe 1 has become so great that the locking of the slide valve 53 in the position shown in Fig. 2 is overcome, the slide valve is suddenly axially displaced so that full communication is obtained between the auxiliary reservoir 3 and the cylinder 6 of the single-chamber air brake. By this means the said brake is put into action and the brake shoes are by a quick movement brought into contact with the wheels. If the pressure in the brake pipe 1 at this phase of operation had been kept at the value existing when the slide valve 53 changed its position, the effected brake action would therefore be dependent on that pressure only which the single-chamber air brake could produce. At the same time that the piston 7 of the single-chamber air brake is moved towards the other end, the pipe 16 leading to one side of the piston 10 in the two-chamber air brake is opened. As however the pressure in the brake pipe 1 and therefore on the opposite side of the piston 10 is still higher than the pressure in the cylinder 6 of the single-chamber brake, the two-chamber brake still remains out of action. If thereupon the conductor further opens the conductor's valve, the pressure in the brake pipe 1 is further decreased, so that the pressure therein is somewhat lower than the pressure communicated from the auxiliary reservoir 3 through the cylinder of the single-chamber brake to one side of the piston 10, which latter then commences to move in the direction of applying the brake, to an extent which depends on the difference in the pressures. Upon the movement of the piston 10, the clutch device connected thereto will engage the piston rod 8 which in this manner is also actuated by the two-chamber brake. The object of the springs 20 is to keep the clutch device sufficiently out of action until the clutches 19 or 23 have received sufficient pressure to ensure a secure grip upon the piston rod 8. When this said pressure is effected, the entire clutch device can follow the piston rod in its movement, the springs 20 being extended.

When the two-chamber brake is put into action in the above stated manner, the pressure of the brake shoes upon the wheels will be increased in the same proportion as the pressure in the brake pipe 1 is decreased. If, on the contrary, the pressure in the brake pipe 1 is increased the brake power will be correspondingly decreased, and by this means the brake power may be controlled at will and continuously without "exhausting" the effect of the brake system.

To release the brake, the pressure in the brake pipe 1 must be increased, whereby the braking action of the two-chamber brake will be gradually decreased. When the pressures on opposite sides of the piston 10 are approximately equal, the said piston 10 returns to its initial position under the influence of the spring 12, the clutch device being simultaneously released from the piston rod 8. The piston 10 however could also be pressed back to its initial position without the help of the spring 12, if the pressure in the main pipe 1, before the release of the brake is completed, is increased, so that it surpasses the pressure communicated through the cylinder of the single-chamber brake.

When thereupon the pressure in the main pipe thus reaches the value which it is intended to have for release of the brake, the triple valve again changes its position and interrupts the communication between the auxiliary air reservoir 3 and the cylinder 6, which latter is brought into communication with the atmosphere, whereby the brake shoes are removed from the wheels while simultaneously the auxiliary air reservoir is again filled from the brake pipe, until the pressures therein are equal.

The single-chamber brake may be so dimensioned as to cause sufficient braking action to be exerted upon an empty railway carriage, while the entire combined brake system is made operative when the carriage is loaded. With this in view the pipe 16 connecting the single-chamber brake with the two-chamber brake is provided with a three-way cock 34 (Fig. 1) one branch of which is in communication with the atmosphere. With an empty carriage, the cock 34 is set so as to interrupt the communication between the cylinders 6 and 9, at the same time that the cylinder 9 is connected with the atmosphere. In this position of the cock 34, the single-chamber brake alone will be put into action upon the reduction of pressure in the brake pipe 1. The pipe 15 which connects the triple valve 2 with the single-chamber brake is also provided with a three-way cock 35; and when the single-chamber brake is to operate alone, the said cock 35 is placed in such position as to reduce its cross sectional area of free passage, that is to say the cock acts as a throttle valve for the purpose of obtaining a slower action of the brake. The cocks 34 and 35 may be mechanically interconnected, so as to operate in unison when either cock is operated.

To effect complete releasing of the brakes on a single loaded carriage in a train which may also comprise a number of loaded carriages while the brakes of the said other carriages need not be released, the mode of operation is as follows, the three-way cock 35 being then also provided with a branch in communication with the atmosphere. The three-way cock 34 is set so as to connect the right-hand chamber in the cylinder 9 with atmosphere; that is to say, the cock is so set as to interrupt communication with cylinder 6, while pipe 16 (which leads to said right-hand chamber) is in communication with atmosphere through the third branch of cock 34. This position of cock 34 (leaving cock 35 out of consideration for the moment) corresponds to braking for empty carriages, in that the single-acting brake 6—7 only will function when the brakes are applied; i. e., the pressure from the auxiliary reservoir 3 passes through the triple valve 2 and the cock 35 to the right-hand chamber in cylinder 6.

Now, then assuming the brakes are applied in the whole train, then the carriage in question would also have its brakes still applied—but by means of the single-chamber brake 6—7 only, and not by the two-chamber brake. However, since the complete release of the brakes of the carriage in question was desired, the position of the cock 35 also has to be changed, so that the right-hand chamber of cylinder 6 will communicate with the atmosphere through the third branch of cock 35, communication with the triple valve 2 being interrupted. In this position of the cocks 34 and 35, the spring 12 in the cylinder 9 of the two-chamber brake and the spring 11 in the cylinder 6 of the single-chamber brake will return the pistons 10 and 7 to their respective initial positions, the brake shoes then being entirely released.

The conduit 16 between the brake cylinders need of course not be formed as a pipe but may just as well be a channel or the like located in the walls of the casing. The sectional area of this channel should be of such dimension that the brake shoes are brought into contact with the wheels by the single-chamber brake before the two-chamber brake comes into action and this is especially the case for a quick or emergency brake effect. As illustrated in the drawing, the pipe or channel 16 enters the cylinder of the single-chamber brake at a place which in the "release" position of the brakes is in communication with the atmosphere through the central hole in the cover of the cylinder 6, and by this means possible leakage passing the piston 10 in the two-chamber brake is discharged. The piston 7 of the single-chamber brake, therefore, must have moved to a certain position of its stroke before the pressure is transferred through the pipe or channel 16 to the two-chamber brake. The working stroke of the single-chamber brake is effected so suddenly relatively to the time the pressure requires to be transferred to the two-chamber brake to cause the latter to come into action, that in any case it may safely be assumed that the brake shoes are brought completely in contact with the wheels before the two-chamber brake effects the actual brake pressure.

Figure 8:
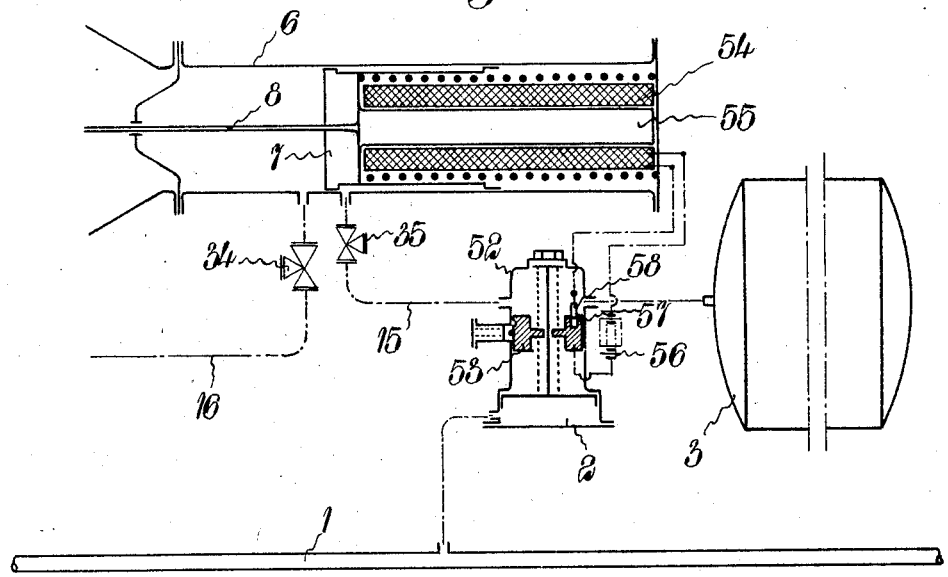
Figure 8 shows the use of a solenoid brake in place of a single-chamber air brake.

As indicated above, the single-chamber air brake may be replaced by its equivalents, and the most obvious equivalent is an electric device, for instance a solenoid 54, the armature 55 of which is integral with the piston rod 8 or connected thereto. The application of the brake shoes becomes in this case just as rapid as if a single-chamber air brake were used, and the action is practically the same as aforesaid. Referring to Fig. 8, the solenoid 54 is magnetized by a current supply 56, coupled in a circuit which may be opened and closed, respectively, by a contact device attached to the triple valve 2, one contact 57 being fixed to the slide valve 53 and the other contact 58 being attached to, but insulated from, the casing 52 of the triple valve. When the brakes are in released position, the contact device or switch 57, 58 is closed, the solenoid 54 is magnetized and the armature 55 attracted (drawn into the solenoid). When the brakes are to be applied, the pressure in the main pipe 1 is reduced, so that the valve 53 in the triple valve will move downwards, thereby separating the contacts. The solenoid 54 is thereby demagnetized, and the pressure from the auxiliary reservoir 3, passing through the triple valve 2, the conduit 15 and the cock 35, will force the piston 7 towards the left, thus causing the brakes to be applied. When the brakes are to be released, the pressure in the main pipe 1 is increased, whereby the valve 53 is moved upward and the contact device 57, 58 closed, so that the solenoid 54 is magnetized and the armature 55 and, hence, the piston rod 8, moved to the right.

It is to be understood that other equivalents for the single-chamber air brake may be adopted than that above described, the chief point being that these equivalents must work so as to have a quick action for applying the brake shoes and at the same time bring the above described improved two-chamber brake into action, so that the function of the latter (that is, the actual application of the brake pressure) commences approximately at the end of the application of the brake shoes.

If the device for bringing the brake shoes into contact with the wheels has the form of a brake, for instance the above described single chamber brake, it may, as aforesaid, be so constructed as to obtain sufficient brake power for, for instance, empty carriages. If, on the contrary, the said device is constructed without any actual brake power, a maximum brake power for empty and loaded carriages respectively may however be obtained by mounting two different two-chamber brakes on one and the same central tube-like member. These two brakes could be constructed having different cylinder diameters in accordance with the maximum brake power required for each special case. As also in this modification of the system one clutch device only is necessary, the whole brake system need not be more complicated than the system above described. If, however, complication is considered immaterial, each one of the two-chamber brakes may of course be provided with its own clutch device. By means of two three-way cocks the connections with the brake pipe and the auxiliary reservoir are created and interrupted respectively. If the piston in one brake is not required to work, the two three-way cocks are turned to connect with the atmosphere. Obviously as many two-chamber brake pistons as desired may be mounted on one and the same tube-like member and adapted to work in cooperation with the same clutch device, and by giving the cylinders different diameters, the maximum brake power may be varied within very wide limits. It will be easily understood that a plurality of two-chamber brakes on a common tube-like member and having a common clutch device may also be utilized in combination with any device for bringing the brake shoes in contact with the wheels, for instance the above described single chamber air brake may be used for this purpose.

Thus, by means of the above described arrangement of a plurality of two-chamber brake pistons on a common tube-like member and having a common clutch device, it is possible to obtain a large total piston area, while the diameters of the brake cylinders are comparatively small. Further, by having each of the two-chamber brake cylinders connected, as above stated, with the brake pipe and with the pressure pipe from the device for applying the brake shoes, it is possible to cut in and cut out respectively by means of special cocks the number of cylinders which are considered necessary or unnecessary. By this means it will be possible, as aforesaid, to vary the maximum brake power within wide limits. It however should be specially emphasized that this capability of varying the maximum brake power is obtained without eliminating or reducing the advantages of the brake system according to the present invention. The said capability is further obtained without complicating the brake system or without increasing the costs of manufacture to a considerable extent. It is further pointed out that no other system of through-brakes for trains, as far as is known, is capable of offering more than at the most two different maximum brake powers (generally one for empty carriages and one for loaded carriages), and to adapt the known systems for more than two brake powers could only be effected at the expense of very complicated and very costly contrivances.

That a brake system which may be set to give one maximum brake power for empty carriages and one for loaded carriages cannot be considered as fully satisfactory for long goods trains will be clear from the fact that the complete application of the brake of a wagon (that is the pressure of the brake shoes upon the wheels expressed in percentage of the pressure of the wheels upon the rails), when it is empty, is about 90% and when it is fully loaded about 55% only. It, therefore, is quite obvious that this considerable difference in the brake effect causes extremely different retardations upon the empty and fully loaded wagons respectively, and the result thereof will be that the coupling gears of the wagons will be subjected to violent imparts and jerks which in many cases cause a breakage thereof.

If, therefore, the maximum brake power for goods wagons could be set to correspond to empty, half-loaded and fully loaded wagons, the brake effect obviously would be more even throughout the whole train and also the retardation of the wagons would be more equal, so that the objectionable jerks and impacts would be eliminated.

The brake system according to the present invention may very easily be arranged to effect various brake powers and for this reason, it is especially adaptable for brakes in goods trains. The modification shown in Fig. 4 is particularly arranged to vary the brake power according to its application on empty, half-loaded and fully loaded wagons, respectively. The device for bringing the brake shoes in contact with the wheels consists of a single-chamber air brake of the kind described above. In the position of the parts shown in Fig. 4 the brake system is set to suit fully loaded wagons, the device for applying the brake shoes and the pistons in the brake pressure cylinders being in "released" position.

If the brake system according to Fig. 4 is to be used for half-loaded wagons, the cylinder $9^a$ is cut out by interrupting its connection with the brake pipe 1 (through the pipes $17^a$, 17) and with the pressure pipe $16^a$, 16 from the brake shoe applying device. It is however not sufficient, as stated above, to only close the said connections leading to the cylinder $9^a$, for a possible difference in pressure in the said cylinder (that is, on both sides of the piston $10^a$) must be overcome. For this reason the pipes $17^a$ and $16^a$ must be connected to the atmosphere or else connected with each other, so that the pressure is balanced on both sides of the piston $10^a$. Amongst these two possibilities of balancing the pressure, the first named method (the connection to the atmosphere) is to be preferred, and for this purpose the closing of the pipes $16^a$, 16 and $17^a$, 17 is preferably carried into effect by three-way cocks, whereby the pipes are connected to the atmosphere as soon as their interconnection is interrupted.

In the same manner as the cylinder $9^a$ is cut out, when the brake system is required to function on half-loaded wagons, the cylinder $9^b$ may also be cut out when the brake system is to be set for an empty wagon.

In order to enable the brake on single wagons to be released without necessitating an increase of pressure in the brake pipe, the pipes 16 and $16^c$ and 17 and $17^c$ leading to the cylinder $9^c$ must be arranged so as to be closed by three-way cocks. If these three-way cocks are so set that the connections between the pipes $16^c$ and 16, and $17^c$ and 17 are interrupted and the pipes $16^c$ and $17^c$ are connected with the atmosphere, the cylinder $9^c$ is also put out of action.

Thus, in order to release the brake on a fully loaded wagon it is necessary to cut out the cylinders $9^a$, $9^b$ and $9^c$, whereby the two chamber brake pistons will be pressed by the springs 12 into their initial position. There remains however to cause the brake shoe applying piston 7 to occupy "release" position, which may be achieved in the manner described in connection with the description of Fig. 1 (that is to say, by the provision of a three-way cock in the pipe 15, by means of which the connection with the auxiliary reservoir is interrupted, and the pressure space in the cylinder 6 is connected with the atmosphere).

In the embodiment diagrammatically shown in Fig. 4 and having pipes or channels for cutting in and out respectively the connection with the brake pressure cylinders from the brake pipe and auxiliary reservoir (through the brake shoe applying device) there will be required seven three-way cocks. To set all these cocks into correct position involves naturally waste of time. It is true, they could be provided with a common operating device, so that they could be set by means of a handle, but such a device together with the costs of the three-way cocks is not desirable.

To eliminate these drawbacks of accomplishing the controlling of the brake effect by the intermediary of three-way cocks and to substitute a single valve device for the same, obviously is the ideal solution of the problem under consideration and in addition more in unity with the simple construction of the brake system according to the present invention. A valve device serving this purpose is shown in Fig. 4 as at 36.

The said valve 36 consists of a flat circular disc into which the pipes 16, $16^a$, $16^b$, $16^c$ and 17, $17^a$, $17^b$, $17^c$ open. The face of the disc is covered by a rotary valve having cavities 37 and 38 respectively, by means of which, for instance in the position shown in Fig. 4 adapted to serve on a fully loaded wagon, the pipe 16 is in communication with the pipes $16^a$, $16^b$ and $16^c$ and the pipe 17 with the pipes $17^a$, $17^b$ and $17^c$.

In Fig. 5 the valve 36 is shown set to serve on a half-loaded wagon. As stated above, in this case the pipe $16^a$ should no longer be in communication with the pipe 16 nor the pipe $17^a$ with the pipe 17, but both pipes $16^a$ and $17^a$ should be connected with the atmosphere. This can be effected by rotating the valve so much as to move the cavities 37 and 38 respectively out of register with the mouths of the pipes $16^a$ and $17^a$ respectively. By the said rotation however two other cavities 39 and 40 respectively have been placed in register with the mouths of the pipes $16^a$ and $17^a$ respectively. These cavities 39 and 40 are in communication with each other by means of a channel 41 connected with the atmosphere. Thus, by a fraction of a revolution of the valve 36, the cylinder $9^a$ has been cut out.

In a similar manner the cylinder $9^b$ may be cut out, when the brake is to act on an empty wagon. The position of the valve in this case is shown in Fig. 6.

If the brake on a single wagon is to be released without increasing the pressure in the main pipe, it will be necessary to also cut out the cylinder $9^c$ and thereupon to reduce the pressure in the pressure space of the cylinder 6 (that is, the pressure of the auxiliary reservoir) to such an extent, for instance, that the triple valve 2 is reversed to correspond to the "release" position. All these operations are carried out in the modification shown in Fig. 4 by setting the valve 36 so as to occupy the position shown in Fig. 7. It is to be noted that in this position of the valve 36, the discharge cavity 40 does not extend up to the mouth of the pipe 17. By this means it, therefore, is possible to release, by rotating the valve 36 into the position as shown in Fig. 7, the brake of a single wagon which is coupled to the brake pipe being under pressure, without the necessity of altering this pressure.

The rotary valve member of the valve 36 should be provided with a spring which has the tendency to move the said valve member from the position shown in Fig. 7 into the position shown in Fig. 6, so that the operating handle, when the complete release of the brake has been accomplished, automatically returns to the position corresponding to the braking action on an empty wagon.

The rotation of the valve may of course be effected from each side of the wagon, and in each of three positions of the operating handle corresponding to an empty, half-loaded or fully loaded wagon, a locking device should be provided to prevent the rotary valve from moving by itself into another position.

If the pressure in the brake pipe, when the brakes are released, is for instance 2-5 atmospheres in a brake system according to the present invention, maximum brake power may preferably be obtained by discharging all compressed air from the brake pipe. It is however possible to couple a wagon having a brake system of the just mentioned kind to a train, the brakes of the other wagons of which are actuated by a different type of air brakes, for instance, a type requiring 5 atmospheres in the brake pipe, when the brakes are released, and about 2.5 to 3 atmospheres to obtain maximum brake effect. In such case the pressure in the right hand pressure space of the two-chamber air brake according to the present system, therefore, should not be permitted to sink lower than about 2.5 atmospheres in the brake pipe and atmospheric pressure in the right hand pressure space of the two-chamber air brake. This is achieved by the provision in the pipe 17 of a pressure retaining valve, that is to say a valve which only permits air to discharge from the pipes $17^a$, $17^b$ and $17^c$, until the pressure therein is not lower than 2.5 atmospheres, but allows the forcing in of air from the pipe 17 into the said pipes 17ª, 17ᵇ and 17ᶜ in the ordinary manner. In this way maximum brake effect is obtained in the brake system according to the present invention in the same manner as obtained in the brake systems of the other types above mentioned.

Figure 9:
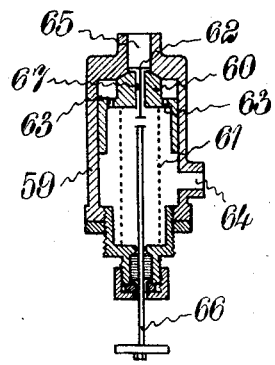
Figure 9 is a sectional view of a pressure-retaining valve.

The presssure retaining valve may be of any conventional type and may consist, as illustrated in Fig. 9, of a cylinder 59 in which a piston valve or slide 60 reciprocates against the action of a spring 61, said piston being provided with a check valve 62 and, further, with small passages 63. The power of spring 61 corresponds to a certain minimum pressure acting on the check valve 62. The operation of this pressure retaining valve is as follows:—

The nipple 64 on the valve casing or cylinder 59 being connected to the main pipe 1 and the nipple 65 to the left-hand chamber of the double-chamber brake, and the pressure in the main pipe being for example 5 atmospheres, while the pressure above the check valve is about 4.5 atmospheres, the piston 60 will be moved upward, assisted by the spring 61, and the check valve 62 opened, thereby causing a flow of pressure fluid from nipple 64 through nipple 65 until the pressure above the check valve has also reached the value of 5 atmospheres. This corresponds to the position of released brakes. When the brakes are to be applied, the pressure in the main pipe and, hence below the piston 60 will be lowered so that the pressure above the check valve will press the piston 60 downward, the excess pressure fluid escaping through the passages 63. If, now, it is intended that the pressure above the check valve is never to fall below a certain predetermined value, for instance 2.5 atmospheres, while the pressure in the main pipe may fall to 0 atmosphere, the spring 61 should have such dimensions that it will keep the balance against the pressure above the check valve and press the piston 60 upward, the pressure above the check valve closing the latter. If, however, the check valve is to be cut out, it will only be necessary to screw the spindle 66 upward, whereby the check valve is lifted from its seat, leaving a passage 67 in the body of the piston 60 free, so that open communication is thus established between the nipples 64 and 65.

The said pressure retaining valve may obviously be provided with a by-pass, so that it may be cut out, when the train consists of wagons having brake systems of the type according to the present invention only. In this case the lower pressure in the brake pipe can be again applied, which obviously is the most advantageous under all circumstances and considerations.

It is quite obvious that the pressure retaining valve may also be adjustable for different minimum pressures in the right hand pressure space of the two-chamber brakes. This adjustment and also the rendering of the by-pass effective may preferably be achieved by means of a handle which may be set in the different positions provided with locking devices and marked, for instance, with the names of the brake systems to which they should be applied.

By means of the present invention all advantages incidental to single-chamber brakes and two-chamber brakes have been taken care of, in that the short brake stroke and the small air consumption of the single-chamber brake and the capability of the two-chamber brake of successively releasing the brakes and, without exhaustion, alternately releasing and applying the brakes repeatedly have been successfully utilized. At the same time the disadvantages of the older constructions have been eliminated, in that the air consumption of the two-chamber brake has been diminished to a minimum and the combination of the latter with the single-chamber brake or its equivalent has been accomplished in a manner which extremely simplifies the construction of the brake system with respect to the transmission means between the piston rod, common to both brakes, and the brake shoes, as also with respect to the operating devices. On electric railways having compressed air brakes, the single-chamber air brake may be replaced, using extremely simple contrivances, by an electric device, and by this means the air consumption is further reduced to a negligible amount, so that the compressors, the auxiliary reservoirs and so on may be made of smaller dimensions than heretofore, which obviously involves all imaginable advantages in utilizing the improved brake system on electric railways.

We claim:—

1. A brake system actuated by fluid pressure having two operating devices of different types, in which one of the said operating devices consists of a brake having quick action and relatively small brake power while the other operating device consists of an air brake having small movement and, in relation to the first named device, great and successively controllable brake power, the said two operating devices cooperatively acting upon a common rod by means of which the brake motion is transferred to the brake shoes.

2. A fluid actuated brake system having two operating devices of different types connected with an auxiliary reservoir and a brake pipe, comprising a single-chamber air brake adapted to move the brake shoes into contact of limited pressure with the wheels, a two-chamber air brake adapted to apply the actual brake pressure, a piston rod common to both air brakes, and means for detachably connecting one of the brake pistons to said common piston rod.

3. A fluid actuated brake system having two operating devices of different types, in which one of the said operating devices consists of a brake having quick action and relatively small brake power while the other operating device consists of an air brake having small movement and, in relation to the first named device, great and successively controllable brake power, the said two operating devices acting upon a common rod by means of a mechanism automatically establishing a releasable connection between said rod and the brake of large braking power when the piston of said latter brake moves in one direction and automatically releasing the connection when said piston moves in the opposite direction.

4. A fluid actuated brake system having two operating devices of different types connected with an auxiliary reservoir and a brake pipe, said two operating devices cooperatively acting upon a common piston rod and comprising a two-chamber air brake and a single-chamber air brake having its cylinder connected to the auxiliary reservoir by means of a triple valve connected also to the brake pipe, said cylinder being in communication with the pressure space on one side of the piston of the two-chamber brake, while the pressure space on the other side of said piston is in communication with the brake pipe.

5. A fluid actuated brake system having two operating devices of different types connected with an auxiliary reservoir and a brake pipe, said two operating devices cooperatively acting upon a common piston rod and comprising a two-chamber air brake and a single-chamber air brake having its cylinder connected to the auxiliary reservoir by means of a triple valve connected also to the brake pipe, said cylinder being in communication with the pressure space on one side of the piston of the two-chamber brake, while the pressure space on the other side of said piston is in communication with the brake pipe, whereby the connection between the two different brake types at the cylinder of the single-chamber brake is effected at such a point that the air pressure applied to the single-chamber brake is only transferred to the two-chamber brake after the single chamber brake piston has moved at least the greatest portion of its stroke for applying the brake shoes.

6. A fluid actuated brake system having two operating devices of different types connected with an auxiliary reservoir and a brake pipe, said two operating devices cooperatively acting upon a common piston rod and comprising a two-chamber air brake and a single-chamber air brake having its cylinder connected to the auxiliary reservoir by means of a triple valve connected also to the brake pipe, said cylinder being in communication with the pressure space on one side of the piston of the two-chamber brake, while the pressure space on the other side of said piston is in communication with the brake pipe, the communication between said brake pipe and the two-chamber brake being permanently open and the connection between the single- and the two-chambered brakes being effected at a point on the cylinder of the single-chamber brake, which point is in communication with the free air when said single-chamber brake is in released position.

7. A fluid actuated brake system having two operating devices of different types connected with an auxiliary reservoir and a brake pipe, said two operating devices cooperatively acting upon a common piston rod and comprising a single- and a two-chambered air brake, the piston rod of the single-chamber brake passing freely through a central aperture in the piston of the two-chamber brake and coacting with a clutch means consisting of releasable clutch members surrounding the piston rod and connected with the piston of the two-chamber brake, said clutch means acting automatically in such a way that the piston of the two-chamber brake is connected to the piston rod when moving in a direction for applying a brake pressure and released from the piston rod when moving in the opposite direction.

8. A fluid actuated brake system having two operating devices of different types, in which one of the said operating devices consists of a brake having quick action and relatively small brake power while the other operating device consists of a two-chamber air brake having small movement and, in relation to the first named device, great and successively controllable brake power, the said two operating devices cooperatively acting upon a common rod by means of which the brake motion is transferred to the brake shoes, whereby the said rod forms the piston rod of the two-chamber brake and passes freely through a central aperture in the piston of said brake, a clutch means releasably connecting the two-chamber air brake piston with said rod and acting automatically in such a way that the said piston is connected to the rod when moving in one direction for applying a brake pressure and released from the rod when moving in the opposite direction.

9. A fluid actuated brake system having two operating devices of different types, in which one of the said operating devices consists of a brake having quick action and relatively small brake power while the other operating device consists of a two-chamber air brake having small movement and, in relation to the first named device, great and successively controllable brake power, the said two operating devices cooperatively acting upon a common rod by means of which the brake pressure is tranferred to the brake shoes, whereby the said rod forms the piston rod of the two-chamber air brake piston in the central part of which piston is arranged a tubular member, through which the rod freely passes, a releasable clutch member being connected with the two-chamber air brake piston and automatically coacting with the said rod in such a way that the said piston is connected with the rod when moving in one direction for applying a brake pressure and released when moving the opposite direction.

10. A fluid actuated brake system having two operating devices of different types connected with an auxiliary reservoir and a brake pipe, said two operating devices cooperatively acting upon a common piston rod and comprising a short-stroke two-chamber air brake and a relatively-long-stroke single-chamber air brake having its cylinder connected to the auxiliary reservoir by means of a triple valve, a three-way cock being provided in the connection between the single-chamber air brake and the triple valve and arranged in such a way that it may serve to break the said connection and to set the single-chamber air brake cylinder in communication with the atmosphere.

11. A fluid actuated brake system having two operating devices of different types connected with an auxiliary reservoir and a brake pipe, said two operating devices cooperatively acting upon a common piston rod and comprising a short-stroke two-chamber air brake and a relatively-long-stroke single-chamber air brake having its cylinder connected to the auxiliary reservoir by means of a triple valve which is also connected with the brake pipe, and with the two-chamber air brake cylinder, the connection being effected at a point of the single-chamber air brake cylinder, which point is in communication with the atmosphere when said single-chamber brake is released, said connection being provided with a three-way cock by means of which the communication between the air brake cylinders may be interrupted and the two-chamber air brake brought in communication with the atmosphere.

12. A fluid actuated brake system having two operating devices of different types, in which one of the said operating devices consists of a brake having quick action and relatively small brake power while the other operating device consists of a two-chamber air brake having small movement and, in relation to the first named device, great and successively controllable brake power, the said two operating devices cooperatively acting upon a common rod by means of which the brake motion is transferred to the brake shoes, the two-chamber air brake piston being releasably connected to said rod by clutch members connected with said piston and automatically acting upon the rod in such a way that the piston is connected to the rod when moving in a direction for applying a brake pressure and released when moving in the opposite direction, the said piston being spring actuated for bringing it back into normal position corresponding to released brakes when the pressures on both sides of the piston permit of such return action.

13. A fluid actuated brake system having two operating devices of different types connected with an auxiliary reservoir and a brake pipe, said two operating devices cooperatively acting upon a common piston rod and comprising a two-chamber air brake and a single-chamber air brake, of which the piston of the first-named brake is detachably coupled to the piston rod, the single-chamber air brake having its cylinder connected to the auxiliary reservoir by means of a slidable triple valve also connected to the brake pipe, said triple valve being actuated by a piston through the intermediary of springs and provided with lost motion of an extent to interrupt the communication established on both sides of the said piston by means of a by-pass before the piston can actuate the slide valve through the intermediary of the said springs.

14. A fluid actuated brake system having two operating devices of different types connected with an auxiliary reservoir and a brake pipe and comprising a two-chambered and a single-chambered air brake cooperatively acting upon a common piston rod in relation to which the two-chamber air brake piston is detachably coupled, a connection between the single-chamber air brake cylinder and the auxiliary reservoir, a triple valve also connected with the brake pipe arranged in said connection and comprising a slide valve actuated by a piston through the intermediary of springs and provided with lost motion of such an extent as to interrupt a communication established on both sides of the said piston by means of a by-pass before the piston can actuate the slide valve through the intermediary of said springs, the slide valve at both of its end positions coacting with locking devices, the locking action of which must be overcome by the piston before the valve can be moved.

15. A brake system actuated by fluid pressure having a number of operating devices cooperatively acting upon one and the same rod by means of which the brake pressure is transferred to the brake shoes, one of said operating devices being a quick action brake of relatively small brake power and each of the others a two-chamber air brake of small movement and, in relation to the first named brake device, great and successively controllable brake power.

16. A brake system actuated by fluid pressure having a number of operating devices cooperatively acting upon one and the same rod by means of which the brake pressure is transferred to the brake shoes, one of said operating devices being a quick action brake of relatively small brake power and each of the others a two-chamber air brake of small movement and, in relation to the first named brake device, great and successively controllable brake power, the pistons of said last named air brakes being detachably coupled to the common rod by clutch means automatically acting in such a manner that the pistons of the two-chamber air brakes are connected to the rod when moving in a direction for applying a brake pressure and released from the rod when moving in the opposite direction.

17. A brake system actuated by fluid pressure having a number of operating devices cooperatively acting upon one and the same rod by means of which the brake pressure is transferred to the brake shoes, one of said operating devices being a quick action brake of relatively small brake power and each of the others being a two-chamber air brake of small movement and, relatively to the first named brake device, great and successively controllable brake power, the pistons of said last named air brakes being rigidly connected to each other so as to move in unison and detachably coupled to the common rod by a common clutch means automatically acting in such a manner that the pistons of the two-chamber air brakes are connected to the rod when moving in a direction for applying a brake pressure and released from the rod when moving in the opposite direction.

18. A brake system actuated by fluid pressure having a number of operating devices connected with an auxiliary reservoir and a brake pipe and cooperatively acting upon one and the same piston rod by means of which the brake pressure is transferred to the brake shoes, one of said operating devices being a single-chamber air brake and each of the others being two-chamber air brakes, the pistons of the last named air brakes being rigidly connected by means of a substantially central sleeve serving as guide for the piston rod, said sleeve being detachably coupled to the piston rod by clutch means automatically acting in such a manner that the pistons of the two-chamber air brakes are connected to the piston rod when moving in unison in a direction for applying a brake pressure and released from the piston rod when moving in the opposite direction.

19. A brake system actuated by fluid pressure having a number of operating devices cooperatively acting upon one and the same piston rod by means of which the brake pressure is transferred to the brake shoes, one of said operating devices being a single-chamber air brake connected with an auxiliary reservoir by means of a triple valve also connected to a brake pipe and each of the other operating devices being a two-chamber air brake separately connectible with the single-chamber air brake and the brake pipe by means of a common valve member, said two-chamber air brakes having pistons rigidly connected with each other and detachably coupled to the common piston rod by clutch means automatically acting in such a manner that the pistons of the two-chamber air brakes are connected to the piston rod when moving in unison in a direction for applying a brake pressure and released from the said rod when moving in the opposite direction.

In testimony whereof we have signed our names to this specification.

ANDERS ANDERBERG.
ERIK ANDERS ANDERBERG.